(12) United States Patent
Tsai et al.

(10) Patent No.: US 12,152,975 B2
(45) Date of Patent: Nov. 26, 2024

(54) PARTICLE SENSING DEVICE

(71) Applicant: INDUSTRIAL TECHNOLOGY RESEARCH INSTITUTE, Hsinchu (TW)

(72) Inventors: Tsung-Yu Tsai, Tainan (TW); Guang-Huei Gu, Tainan (TW); Chih-Jen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 417 days.

(21) Appl. No.: 17/185,625

(22) Filed: Feb. 25, 2021

(65) Prior Publication Data

US 2022/0155204 A1 May 19, 2022

(30) Foreign Application Priority Data

Nov. 18, 2020 (TW) .................................. 109140381

(51) Int. Cl.
*G01N 15/06* (2024.01)
*G01N 15/075* (2024.01)

(52) U.S. Cl.
CPC ........... *G01N 15/06* (2013.01); *G01N 15/075* (2024.01)

(58) Field of Classification Search
CPC ....................... G01N 15/06; G01N 2015/0693
See application file for complete search history.

(56) References Cited

U.S. PATENT DOCUMENTS 5,125,737 A * 6/1992 Rodriguez ......... G01N 15/1459
356/338
5,353,790 A * 10/1994 Jacques .............. A61B 5/14546
600/315

(Continued)

FOREIGN PATENT DOCUMENTS

CN 1207172 A 2/1999
CN 103454194 A 12/2013

(Continued)

OTHER PUBLICATIONS

Publication data for NPL No. 3, "Miniaturized PM2.5 Particulate Sensor Based on Optical Sensing" Apr. 2015.*

(Continued)

*Primary Examiner* — Edmond C Lau
*Assistant Examiner* — Jarreas Underwood
(74) *Attorney, Agent, or Firm* — Maschoff Brennan

(57) ABSTRACT

A particle sensing device, configured to detect a particulate concentration in a fluid, includes a detecting channel, a sensing space, a light source and a sensor. The detecting channel is configured for the fluid to flow therethrough. The sensing space is located on one side of the detecting channel and connected to the detecting channel, and the sensing space is surrounded by a surrounding wall. The light source and the sensing space are located on opposite sides of the detecting channel, and the light source is configured to emit light towards the detecting channel. The light is configured to hit at least one particle in the fluid. The sensor is disposed on an inner surface of the surrounding wall, and the sensor is configured to detect a scattered light energy generated when the light hits the particle. The sensor is a distance apart from the detecting channel.

18 Claims, 4 Drawing Sheets

(56) References Cited

U.S. PATENT DOCUMENTS

| | | | |
|---|---|---|---|
| 5,690,895 A * | 11/1997 | Matsumoto | G01N 21/05 356/73 |
| 6,104,491 A * | 8/2000 | Trainer | G01N 15/02 356/336 |
| 7,092,084 B2 * | 8/2006 | Payne | G01N 21/05 356/440 |
| 7,292,338 B2 | 11/2007 | Itagaki | |
| 7,782,459 B2 | 8/2010 | Holve | |
| 7,932,490 B2 | 4/2011 | Wang et al. | |
| 8,154,723 B2 | 4/2012 | Fu et al. | |
| 8,534,116 B2 | 9/2013 | Wang et al. | |
| 9,116,121 B2 * | 8/2015 | Kaye | G01N 15/0205 |
| 9,423,335 B2 | 8/2016 | Gabriel | |
| 10,094,755 B1 * | 10/2018 | Chandler | G01N 21/53 |
| 10,272,428 B2 | 4/2019 | McGuinness et al. | |
| 11,280,715 B2 | 3/2022 | Kelly et al. | |
| 11,719,615 B2 * | 8/2023 | Nakai | G01M 11/005 356/338 |
| 11,761,890 B2 * | 9/2023 | Shimadzu | G08B 17/107 356/337 |
| 11,879,819 B2 | 1/2024 | Paprotny et al. | |
| 2008/0221711 A1 * | 9/2008 | Trainer | G01N 15/1459 356/338 |
| 2011/0066382 A1 * | 3/2011 | Adams | G01N 33/1893 702/19 |
| 2013/0042893 A1 * | 2/2013 | Ariessohn | B03C 3/12 137/560 |
| 2015/0253165 A1 * | 9/2015 | Ajay | G01F 1/66 73/28.01 |
| 2016/0356695 A1 * | 12/2016 | Gabriel | G01N 15/1459 |
| 2017/0241893 A1 * | 8/2017 | Walls | G01N 15/0205 |
| 2018/0238845 A1 * | 8/2018 | Eliason | G01N 21/255 |
| 2020/0116604 A1 * | 4/2020 | Kelly | B01L 7/525 |
| 2020/0158615 A1 * | 5/2020 | Shi | G01N 15/1459 |
| 2020/0271565 A1 * | 8/2020 | Gütle | G01N 1/2273 |
| 2021/0255086 A1 * | 8/2021 | Nakai | G01N 15/1459 |
| 2022/0042900 A1 * | 2/2022 | Gütle | G01N 15/1436 |
| 2022/0107303 A1 * | 4/2022 | Goltzman | F02M 37/28 |
| 2022/0155204 A1 * | 5/2022 | Tsai | G01N 15/06 |

FOREIGN PATENT DOCUMENTS

| | | |
|---|---|---|
| CN | 203551443 | 4/2014 |
| CN | 104266947 A | 1/2015 |
| CN | 104266948 | 1/2015 |
| CN | 204128925 | 1/2015 |
| CN | 204536159 U | 8/2015 |
| CN | 204789269 | 11/2015 |
| CN | 105283760 A | 1/2016 |
| CN | 205246490 | 5/2016 |
| CN | 106066296 | 11/2016 |
| CN | 206787993 U | 12/2017 |
| CN | 109791104 A | 5/2019 |
| CN | 110095316 A | 8/2019 |
| CN | 110325838 A | 10/2019 |
| CN | 110426330 A | 11/2019 |
| CN | 110998281 A | 4/2020 |
| EP | 3258241 A2 | 12/2017 |
| JP | 2019-158722 A | 9/2019 |
| TW | 201621294 A | 6/2016 |
| TW | 201928325 A | 7/2019 |
| TW | I667461 B | 8/2019 |
| TW | I739528 B | 9/2021 |
| WO | 2020/088843 A1 | 5/2020 |

OTHER PUBLICATIONS

Wang et al., "A Novel Optical Instrument for Estimating Size Segregated Aerosol Mass Concentration in Real Time", Aerosol Science and Technology, Jul. 2, 2009.

Chen et al., "An Open Framework for Participatory PM2.5 Monitoring in Smart Cities", IEEE Access, Jul. 2017.

Tong et al., "Miniaturized PM2.5 Particulate Sensor Based on Optical Sensing" 2015 Northeast Section Conference of the American Society for Engineering Education (ASEE, Apr. 30, 2015.

Taiwan Office Action issued in corresponding application No. 109140381, dated Nov. 4, 2021.

TW Office Action dated Dec. 22, 2021 as received in Application No. 109140381.

CN Office Action dated Dec. 29, 2023 as received in Application No. 202110067521.9.

* cited by examiner

PARTICLE SENSING DEVICE

CROSS-REFERENCE TO RELATED APPLICATIONS

This non-provisional application claims priority under 35 U.S.C. § 119(a) on Patent Application No(s). 109140381 filed in Taiwan, R.O.C. on Nov. 18, 2020, the entire contents of which are hereby incorporated by reference.

TECHNICAL FIELD

This disclosure relates to a particle sensing device.

BACKGROUND

In recent years, many countries have suffered from severe particulate matter pollution, and more and more people are well aware that the particulate matter pollution is harmful to health, thus prompting the governments to pay more attention to the problem of particulate matter pollution.

A suspended particle sensor device usually measures particulate concentration via light scattering techniques, and the suspended particle sensor device comprises a light source and a light sensor. The suspended particle sensor device detects particles by using the light source emitting light towards the fluid and the light sensor sensing scattered light. As the suspended particle sensor device under operation, the light path, flow field of the fluid and light sensor are orthogonal with one another, wherein the light sensor is disposed at a position where the fluid passes through. As such, after the suspended particle sensor device operates for a long period, large particles or dust would accumulate on the light sensor, so that the accuracy of measurement of suspended particulate concentrations is decreased, sensing errors may occur and the service life of the device would be reduced. Accordingly, how to improve conventional suspended particle sensor devices so as to prevent suspended particles from accumulating on the sensor is an important topic in this field.

SUMMARY

The present disclosure is to provide a particle sensing device is capable of preventing particles from accumulating on the sensor, thereby ensuring measurements of particulate concentrations, reducing sensing errors and thus extending the service life of the particle sensing device.

One embodiment of the disclosure provides a particle sensing device configured to detect a particulate concentration in a fluid. The particle sensing device includes a detecting channel, a sensing space, a light source and a sensor. The detecting channel is configured for the fluid to flow therethrough. The sensing space is located on one side of the detecting channel and connected to the detecting channel, and the sensing space is surrounded by a surrounding wall. The light source and the sensing space are located on opposite sides of the detecting channel, and the light source is configured to emit light towards the detecting channel. The light is configured to hit at least one particle in the fluid. The sensor is disposed on an inner surface of the surrounding wall, and the sensor is configured to detect a scattered light energy generated when the light hits the at least one particle. In addition, the sensor is a distance apart from the detecting channel.

According to the particle sensing device as described above, the sensor is disposed outside the detecting channel, such that the fluid to be detected is prevented from flowing through the sensor so as to prevent the particles in the fluid from settling and accumulating on the sensor. Therefore, the sensing accuracy of the sensor can be maintained and the sensing error can be reduced so as to extend the service life of the particle sensing device.

DETAILED DESCRIPTION

Figure 1:
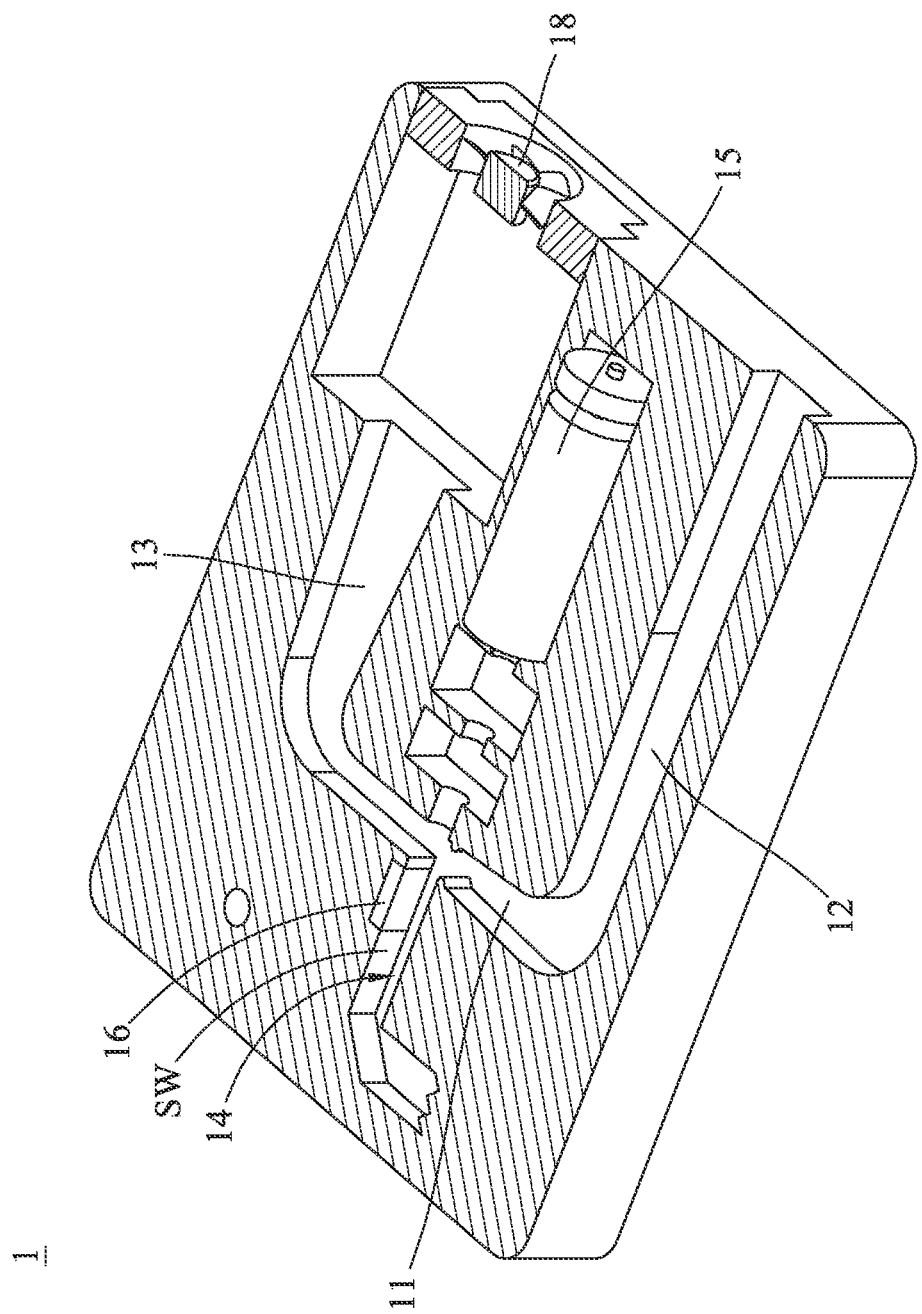
FIG. 1 is a sectional perspective view of a particle sensing device in accordance with the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The drawings may not be drawn to actual size or scale, some exaggerations may be necessary in order to emphasize basic structural relationships, while some are simplified for clarity of understanding, and the present disclosure is not limited thereto. It is allowed to have various adjustments under the spirit of the present disclosure. In the specification, the term "on" may be described as "one is located above another" or "one is in contact with another". In addition, the terms "top side", "bottom side", "above" and "below" are used to illustrate but limit the present disclosure. The term "substantially" is referred to the complete or nearly complete extent or degree of a structure, which means that it is allowable to have tolerance during manufacturing.

Figure 2:
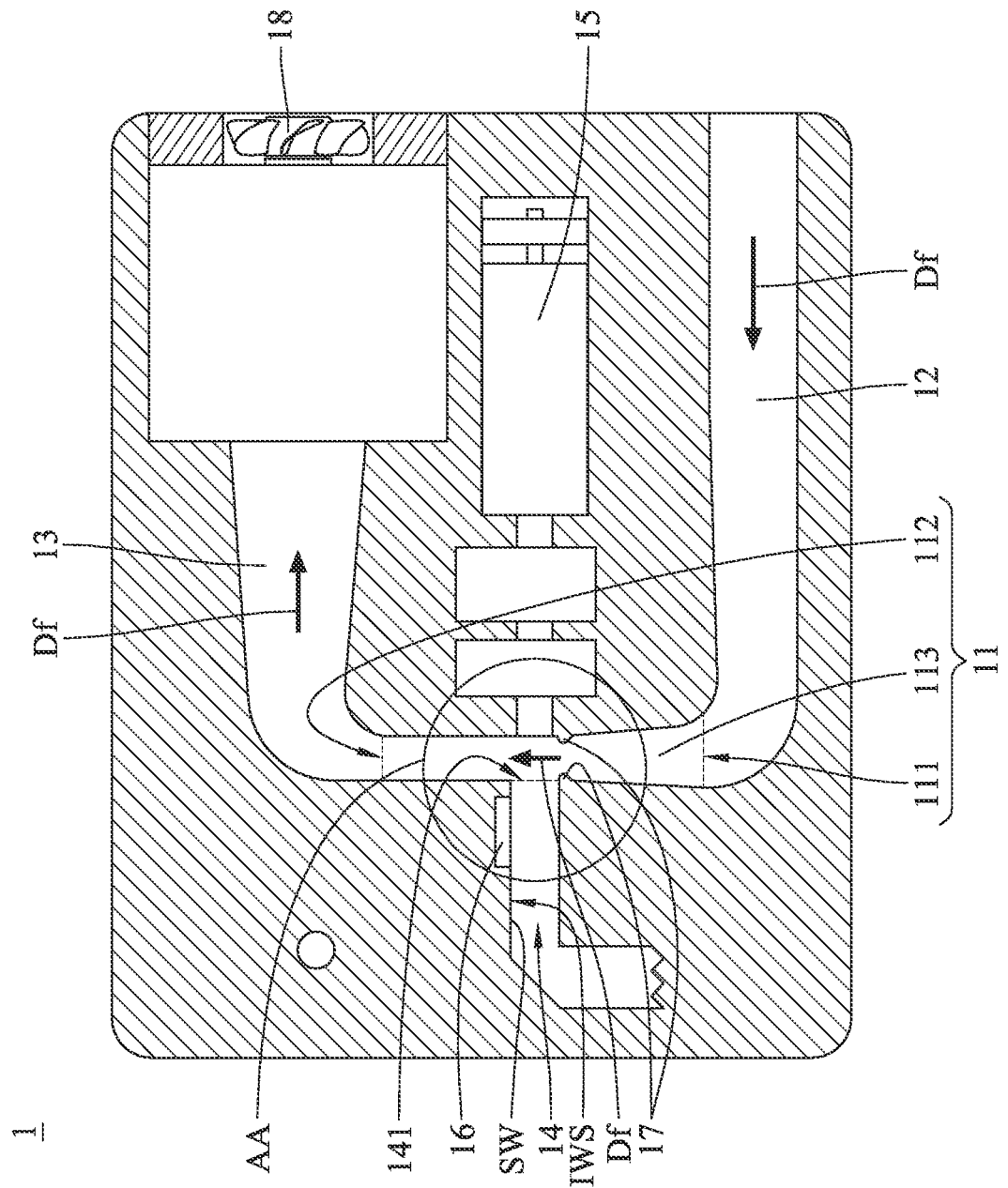
FIG. 2 is a top view of the particle sensing device in FIG. 1.
Figure 3:
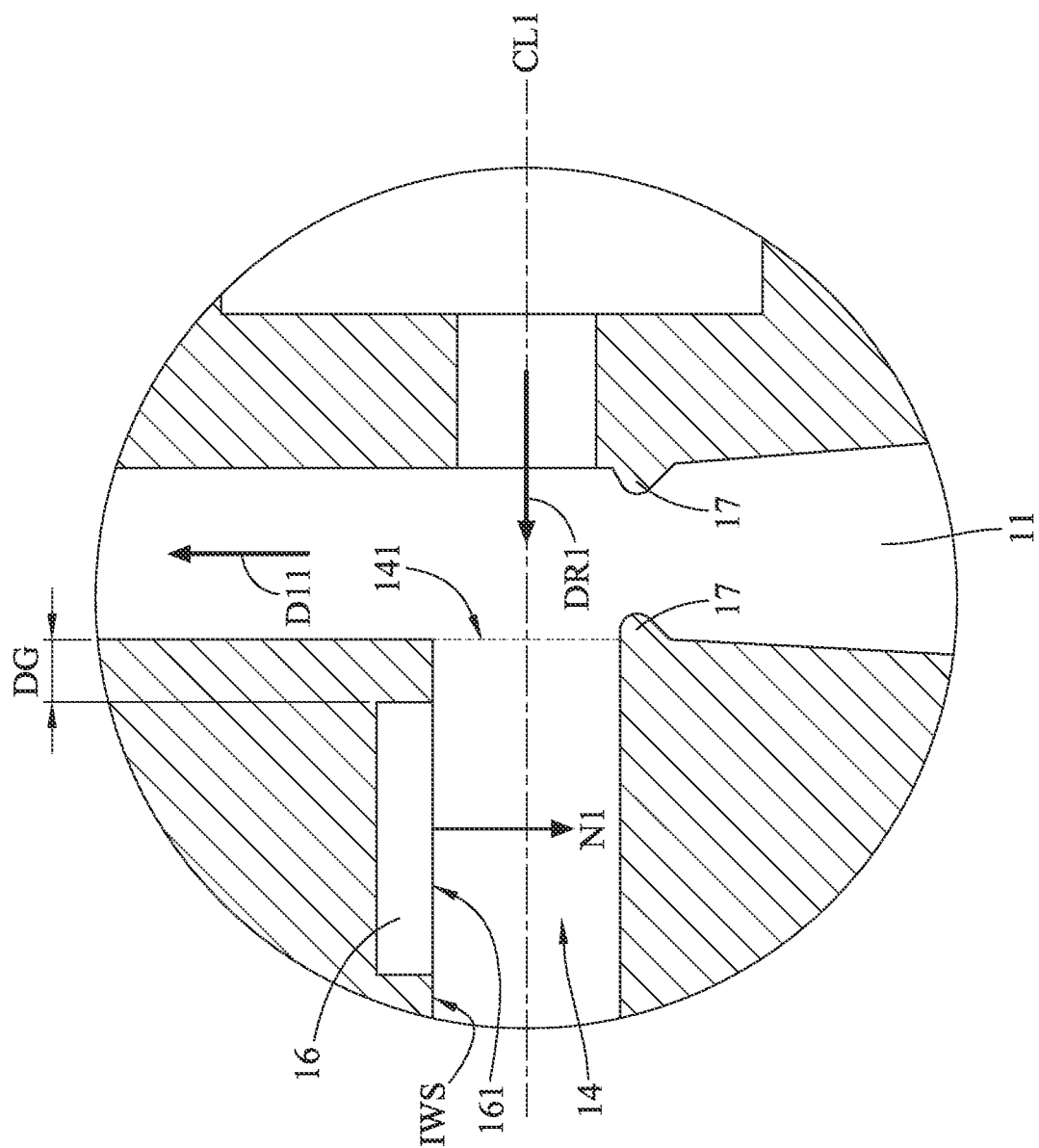
FIG. 3 is an enlarged view of region AA of the particle sensing device in FIG. 2.

Please refer to FIG. 1 to FIG. 3, where FIG. 1 is a sectional perspective view of a particle sensing device in accordance with the first embodiment of the disclosure, FIG. 2 is a top view of the particle sensing device in FIG. 1, and FIG. 3 is an enlarged view of region AA of the particle sensing device in FIG. 2.

In this embodiment, a particle sensing device 1 is provided. The particle sensing device 1 is configured to detect a particulate concentration in a fluid. The particle sensing device 1 includes a detecting channel 11, an inflow channel 12, an outflow channel 13, a sensing space 14, a light source 15, a sensor 16, two protrusions 17 and a fan 18.

The detecting channel 11 allows the fluid to be detected to flow therethrough, and the detecting channel 11 has an inlet 111 at an upstream end thereof and an outlet 112 at a downstream end thereof.

The inflow channel 12 is connected to the inlet 111 of the detecting channel 11 and the outflow channel 13 is connected to the outlet 112 of the detecting channel 11 so as to form a flow path for the fluid to flow therethrough. In specific, after the fluid enters in the particle sensing device 1, the fluid flows in a flow direction Df through the inflow channel 12, the detecting channel 11 and the outflow channel 13 in sequence.

The sensing space 14 is located on one side of the detecting channel 11, and the sensing space 14 has a space opening 141 connected to the detecting channel 11. As such, the sensing space 14 is a space extending from the detecting channel 11 in a direction away from the detecting channel 11. Furthermore, the sensing space 14 is surrounded by a surrounding wall SW. In this embodiment, a central axis CL1 of the space opening 141 is substantially perpendicular to a flow direction D11 of the detecting channel 11, but the present disclosure is not limited thereto. In other embodiments, the central axis of the space opening and the flow direction of the detecting channel may have an acute angle therebetween according to actual design requirements. In this specification, the term of "one element being substantially perpendicular to another element" can indicate that an angle between two elements (e.g., two lines, two surfaces, or one line and one surface) is 90 degrees or approximately 90 degrees. Moreover, the term of "one element being substantially parallel to another element" can indicate that an angle between two elements (e.g., two lines, two surfaces, or one line and one surface) is 180 degrees or approximately 180 degrees.

The light source 15 is, for example, a laser light source, and the light source 15 and the sensing space 14 are respectively located on opposite sides of the detecting channel 11. The light source 15 is configured to emit light towards the detecting channel 11, and the light is configured to hit at least one particle in the fluid.

The sensor 16 is, for example, a photodiode, and the sensor 16 is disposed on an inner surface IWS of the surrounding wall SW. The sensor 16 is configured to detect a scattered light energy generated when the light hits the at least one particle and convert the same into an electrical voltage signal via a sensor circuit. After the electrical voltage signal are sampled by an analog-to-digital converter, the number of particles passing therethrough can be calculated and the amount of scattered light energy can be measured via a microcontroller, and thus, the particulate concentration of the fluid can be obtained. In addition, the sensor 16 is a distance apart from the detecting channel 11, and there is a distance DG between the sensor 16 and the detecting channel 11; that is, the sensor 16 is disposed outside the detecting channel 11, thereby preventing the fluid from flowing through the sensor 16 so as to prevent particles in the fluid from settling and accumulating on the sensor 16. Therefore, the sensing accuracy of the sensor 16 can be maintained and the sensing error can be reduced so as to extend the service life of the particle sensing device 1. In this embodiment, the sensor 16 has a sensing surface 161, an angle between a direction DR1 of the light emitted from the light source 15 and a normal N1 of the sensing surface 161 is 90 degrees, and the direction DR1 of the light emitted from the light source 15 does not intersect the sensing surface 161.

In this embodiment, the normal N1 of the sensing surface 161 is perpendicular to the direction DR1 of the light emitted from the light source 15 (i.e., the angle therebetween is 90 degrees), but the present disclosure is not limited thereto. In other embodiments, an angle between the direction of light emitted from the light source and the normal of the sensing surface can range from 60 degrees to 120 degrees. Furthermore, in this embodiment, the sensor 16 being disposed in one particular region of the inner surface IWS of the surrounding wall SW is only exemplary, and the present disclosure is not limited to the position arrangement of the sensor 16. It should be realized that as long as the above conditions of "there being a distance DG between the sensor 16 and the detecting channel 11", "the direction DR1 of the light emitted from the light source 15 not intersecting the sensing surface 161" and "the angle between the direction DR1 of the light emitted from the light source 15 and the normal N1 of the sensing surface 161 ranging from 60 degrees to 120 degrees" are satisfied, the sensor 16 can be disposed in any region of the inner surface IWS of the surrounding wall SW that surrounds the sensing space 14 according to actual design requirements.

In this embodiment, the detecting channel 11 has an upstream stretch 113, and the upstream stretch 113 of the detecting channel 11 is located between the space opening 141 of the sensing space 14 and the inlet 111 of the detecting channel 11. In addition, an inner diameter of the upstream stretch 113 of the detecting channel 11 is increasing from the space opening 141 towards the inlet 111 of the detecting channel 11; that is, the inner diameter of the upstream stretch 113 of the detecting channel 11 is decreasing from the upstream end to the downstream end of the upstream stretch 113 of the detecting channel 11. As such, the flow of the fluid can speed up when the fluid flows in the detecting channel 11, so the particles in the fluid can steadily and quickly pass without entering the space opening 141 of the sensing space 14. For example, the cross-section of the upstream stretch 113 of the detecting channel 11 can be rectangular, the cross-sectional area is decreasing from upstream to downstream of the upstream stretch 113, and the area can change from 14 mm$^2$ to 7 mm$^2$. Specifically, the inner width of the upstream stretch 113 of the detecting channel 11 from upstream to downstream of the upstream stretch 113 can change from 3.5 mm to 1.75 mm, and the height of the upstream stretch 113 of the detecting channel 11 can be 4 mm. Furthermore, the length of the space opening 141 of the sensing space 14 in parallel with the flow direction D11 of the detecting channel 11 can be 2.8 mm, the height of the space opening 141 can be 4 mm, and the area of the space opening 141 is 11.2 mm$^2$.

The protrusions 17 are disposed in the detecting channel 11, and the protrusions 17 are located between the space opening 141 of the sensing space 14 and the inlet 111 of the detecting channel 11. The two protrusions 17 are disposed opposite to each other and one of the protrusions 17 is adjacent to the space opening 141 of the sensing space 14. As such, the inner diameter of the detecting channel 11 at the position where the protrusions 17 are located can be further reduced, such that the particles in the fluid can pass more quickly without entering the space opening 141, thereby reducing collisions between particles from happening above the space opening 141 so as to prevent the particles from passing through the space opening 141 into the sensing space 14 or even falling on the sensor 16.

In this embodiment, each of the protrusions 17 is a spherical protrusion having a curved surface, but the shape of the protrusion of the present disclosure is not limited thereto. In other embodiments, the protrusion may have a sharp top end or a blunt top end having a large curvature radius, and said large curvature radius can be, for example, in a range from 0.25 mm to 0.75 mm, and the corresponding curvature is 1.33 to 4. Moreover, in other embodiments, the protrusion adjacent to the space opening can have a side surface extended to and flush with the inner surface of the surrounding wall. Furthermore, the side surface of the protrusion can be a planar surface, and the flow direction of the detecting channel is perpendicular to the side surface of the protrusion.

The fan 18 is disposed at a downstream end of the outflow channel 13 for driving the fluid to flow in the particle sensing device 1 and drawing the fluid out of the particle sensing device 1.

Table 1 below summarizes instrument error changes of the particle sensing device 1 of the present disclosure and a particle sensor device as a control group for comparison under a high dust concentration test. The sensor 16 of the particle sensing device 1 is disposed outside the detecting channel 11, while a sensor of the particle sensor device as control group is disposed inside a detecting channel of the particle sensor device as control group. Specifically, the sensor 16 of the particle sensing device 1 is disposed on the surrounding wall SW of the sensing space 14 extending from one side of the detecting channel 11, while the sensor of the particle sensor device as control group is directly disposed and exposed in the detecting channel. The cross-section of the detecting channel 11 of the particle sensing device 1 and the cross-section of the detecting channel of the particle sensor device as control group are both rectangular, and the size of the detecting channel 11 of the particle sensing device 1 is similar to the size of the detecting channel of the particle sensor device as control group. There are three stages in the high dust concentration test. The first stage is to perform calibration in a smoke chamber, the second stage is to perform experimentation in a high dust concentration chamber, and the third stage is to perform an outdoor test. In the first stage, each of the particle sensing device 1 and the particle sensor device as control group are tested in the smoke chamber for three times, and the median of instrument errors is recorded and compared with a certified sensor device (e.g., MSTC GS). Therefore, differences of the median of instrument errors of the two devices before a dust test are obtained and listed in Table 1. In the second stage, each of the particle sensing device 1 and the particle sensor device as control group is tested in the high dust concentration chamber of a control testing environment, where PM 2.5 concentration is set to be 27.8 ug/m³ as reference in the high dust concentration test, and total test time is 120 hours. In the third stage, the particle sensing device 1, the particle sensor device as control group and the certified sensor device (MSTC GS) are tested in an outdoor environment, and the median of instrument errors of the particle sensing device 1 and the median of instrument errors of the particle sensor device as control group are recorded and compared with the certified sensor device (MSTC GS). Therefore, differences of the median of instrument errors of the two devices after the dust test are obtained and listed in Table 1.

TABLE 1

| | Median of instrument errors | | |
|---|---|---|---|
| | Before dust test (smoke chamber) | After dust test (outdoor test) | Difference |
| Particle sensing device 1 (1st test) | 19.80% | 15.15% | −4.64% |
| Particle sensing device 1 (2nd test) | 20.92% | 27.80% | 6.88% |
| Particle sensing device 1 (3rd test) | 21.91% | 31.01% | 9.10% |
| Particle sensor device as control group (1st test) | 26.47% | −36.67% | −63.14% |
| Particle sensor device as control group (2nd test) | 31.62% | −31.21% | −62.83% |
| Particle sensor device as control group (3rd test) | 27.25% | −41.82% | −68.97% |

As can be seen in Table 1, after the high dust concentration test, the instrument error changes of the particle sensing device 1 are smaller than 30%, which still satisfies the requirements of the Environmental Protection Administration. However, the instrument error changes of the particle sensor device as control group are larger than 30%, which no longer satisfies the usage requirements of the Environmental Protection Administration. Accordingly, it can be known from the test results that the particle sensing device 1 has a longer service life than that of the particle sensor device as control group.

Figure 4:
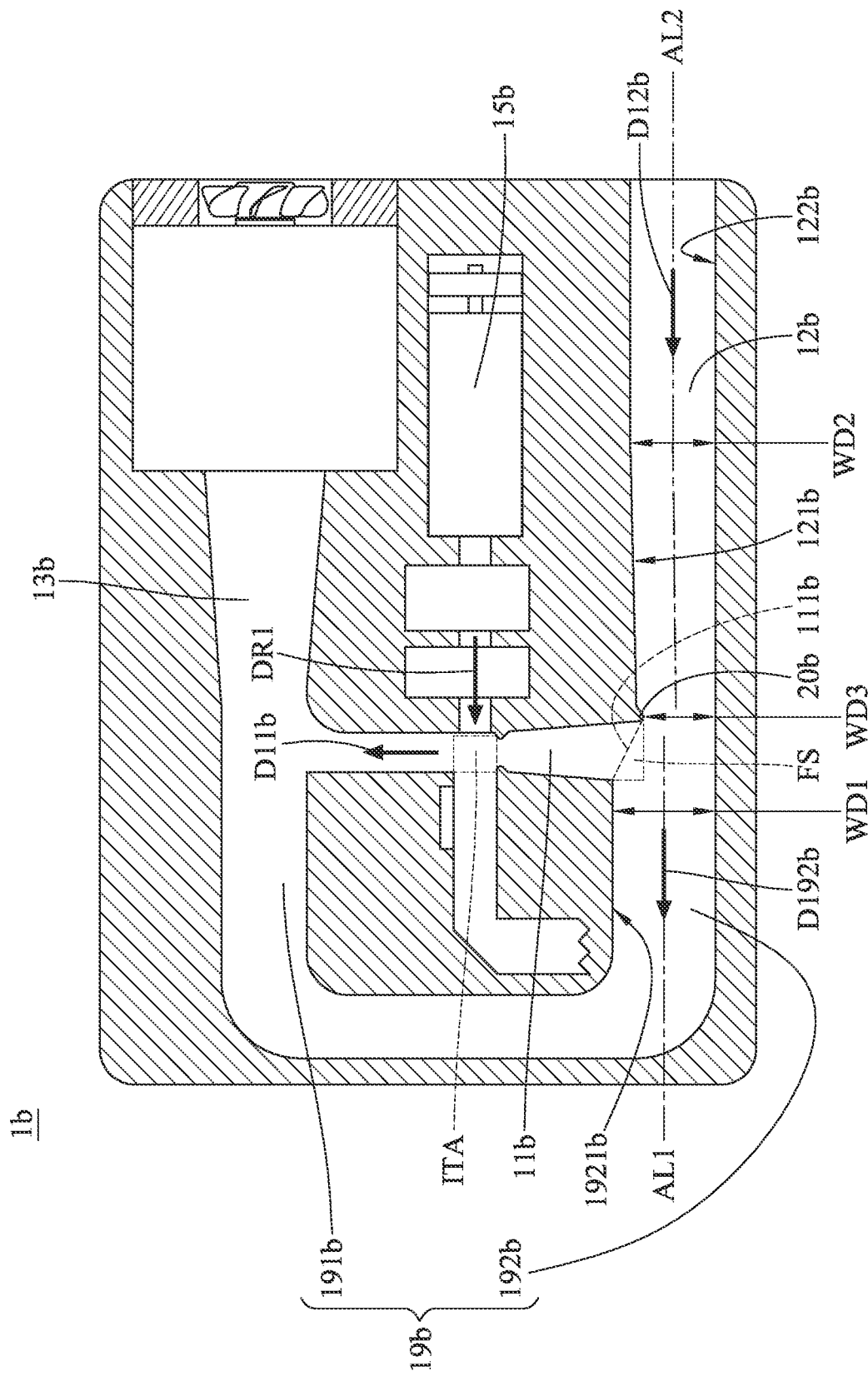
FIG. 4 is a cross-sectional top view of a particle sensing device in accordance with the second embodiment of the disclosure.

Please refer to FIG. 4, which is a cross-sectional top view of a particle sensing device in accordance with the second embodiment of the disclosure.

In this embodiment, a particle sensing device 1b is provided. The particle sensing device 1b has a configuration similar to that of the particle sensing device 1 disclosed in the first embodiment. The difference is that, compared to the particle sensing device 1 in the first embodiment, the particle sensing device 1b further includes a secondary channel 19b and a protrusive structure 20b.

Specifically, the secondary channel 19b includes a downstream stretch 191b and an upstream stretch 192b connected to each other. One end of the downstream stretch 191b of the secondary channel 19b located away from the upstream stretch 192b of the secondary channel 19b is connected to an outflow channel 13b, and one end of the upstream stretch 192b of the secondary channel 19b located away from the downstream stretch 191b of the secondary channel 19b is connected to a junction of an inflow channel 12b and a detecting channel 11b. Furthermore, in this embodiment, a flow direction D12b of the inflow channel 12b is not parallel to a flow direction D11b of the detecting channel 11b, and a flow direction D192b of the upstream stretch 192b of the secondary channel 19b is substantially parallel to the flow direction D12b of the inflow channel 12b. In this embodiment, the flow direction D12b of the inflow channel 12b and the flow direction D192b of the upstream stretch 192b of the secondary channel 19b are substantially perpendicular to the flow direction D11b of the detecting channel 11b. As such, relatively large particles flow directly into the secondary channel 19b due to their higher inertia, and relatively small particles enter the detecting channel 11b due to their lower inertia, thereby achieving the purpose of separating particles with different sizes and reducing the interference of large particles to ensure sensing performance of the sensor. Therefore, the sensing accuracy and the range of high concentration can be increased. Said range of high concentration can be 100 to 500 ug/m³. It can be understood that the particle sensing device is configured to determine the concentration of small particles in the fluid, and if large particles, which is not the object to be detected, enter the detecting channel, the observed concentration would be abnormally increased. As such, the measured concentration of small particles deviates from its actual concentration.

The upstream stretch 192b of the secondary channel 19b has a first inner diameter WD1, the inflow channel 12b has a second inner diameter WD2, and the first inner diameter WD1 is larger than the second inner diameter WD2. In addition, in this embodiment, a ratio of the first inner diameter WD1 to second inner diameter WD2 is 1.5, but the present disclosure is not limited thereto. In other embodiments, a ratio of the first inner diameter to the second inner diameter can range from 1.2 to 2. Furthermore, the upstream stretch 192b of the secondary channel 19b has a first central axis AL1 in parallel with the flow direction D192b of the upstream stretch 192b of the secondary channel 19b, and the inflow channel 12b has a second central axis AL2 in parallel with the flow direction D12b of the inflow channel 12b. In addition, the first central axis AL1 is not coaxial with the second central axis AL2, and the first central axis AL1 is closer to an intersection ITA of a direction DR1 of the light emitted from a light source 15b and the detecting channel 11b than the second central axis AL2 to the intersection ITA. Therefore, the detecting channel 11b has an additional channel space FS extending from an inlet 111b of the detecting channel 11b, and thus, a width of the inlet 111b of the detecting channel 11b increases. As such, when small particles are turning at the junction of the inflow channel 12b and the detecting channel 11b, the small particles can smoothly enter the detecting channel 11b without interferences. Moreover, since large particles have larger turning radii due to their higher inertia and the ratio of the first inner diameter WD1 to the second inner diameter WD2 is such designed that the large particles are blocked by an inner wall 1921b of the upstream stretch 192b of the secondary channel 19b closer to the intersection ITA when turning, the large particles directly enter the secondary channel 19b.

The protrusive structure 20b is located at the junction of the inflow channel 12b and the detecting channel 11b and located on a side wall 121b of the inflow channel 12b located closer to the intersection ITA. In addition, a distance WD3 between the protrusive structure 20b and a side wall 122b of the inflow channel 12b located farther away from the intersection ITA is smaller than the second inner diameter WD2 of the inflow channel 12b. Therefore, the inner diameter difference between the inflow channel 12b and the secondary channel 19b can be further increased, and thus particles with different sizes can be more effectively separated at the diffluence of the inflow channel 12b.

According to the particle sensing device as described above, the sensor is disposed outside the detecting channel, such that the fluid to be detected is prevented from flowing through the sensor so as to prevent the particles in the fluid from settling and accumulating on the sensor. Therefore, the sensing accuracy of the sensor can be maintained and the sensing error can be reduced so as to extend the service life of the particle sensing device.

Furthermore, in one configuration, the inner diameter of the upstream stretch of the detecting channel is decreasing from the upstream end to the downstream end of the upstream stretch of the detecting channel. As such, the flow of the fluid can speed up when the fluid flows in the detecting channel, so the particles in the fluid can steadily and quickly pass without entering the space opening of the sensing space.

Moreover, in one configuration, the protrusion of particle sensing device is disposed between the space opening of the sensing space and the inlet of the detecting channel, the inner diameter of the detecting channel at the position where the protrusion is located can be further reduced, such that the particles in the fluid can pass more quickly without entering the space opening, thereby reducing collisions between particles from happening above the space opening so as to prevent the particles from passing through the space opening into the sensing space or even falling on the sensor.

In addition, in one configuration, the particle sensing device further includes the secondary channel connected to the junction of the inflow channel and the detecting channel. As such, relatively large particles flow directly into the secondary channel due to their higher inertia, and relatively small particles enter the detecting channel due to their lower inertia, thereby achieving the purpose of separating particles with different sizes and reducing the interference of large particles to ensure sensing performance of the sensor. Therefore, the sensing accuracy and the range of high concentration can be increased.

Additionally, in one configuration, the inner diameter of the secondary channel is larger than the inner diameter of the inflow channel, and the central axis of the secondary channel is closer to the intersection of the direction of the light emitted from the light source and the detecting channel than the second central axis to the intersection. Therefore, the detecting channel has the additional channel space extending from the inlet of the detecting channel, and thus, the width of the inlet of the detecting channel increases. Therefore, when small particles are turning at the junction of the inflow channel and the detecting channel, the small particles can smoothly enter the detecting channel without interferences.

Still further, in one configuration, the protrusive structure of the particle sensing device is located on the side wall of the inflow channel located closer to the intersection of the direction of the light emitted from the light source and the detecting channel, the inner diameter difference between the inflow channel and the secondary channel can be further increased, and thus particles with different sizes can be more effectively separated at the diffluence of the inflow channel.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A particle sensing device, configured to detect a particulate concentration in a fluid, the particle sensing device comprising:
   a detecting channel, configured for the fluid to flow therethrough;
   a sensing space, located on one side of the detecting channel and connected to the detecting channel, and the sensing space being surrounded by a surrounding wall;
   a light source, wherein the light source and the sensing space are located on opposite sides of the detecting channel, the light source is configured to emit light towards the detecting channel, and the light is configured to hit at least one particle in the fluid;
   a protrusion, disposed in the detecting channel and adjacent to the space opening, wherein the protrusion is configured to increase the fluid flow speed and reduce collisions between particles so as to prevent particles from passing through the space opening; and
   a sensor, disposed on an inner surface of the surrounding wall, wherein the sensor is configured to detect a scattered light energy generated when the light hits the at least one particle;

wherein the sensor is a distance apart from the detecting channel, and the sensing space is in fluid communication with the detecting channel, wherein the sensor has a sensing surface, the sensing space has a space opening connected to the detecting channel, a central axis of the space opening does not intersect the sensing surface of the sensor, and a direction of the light emitted from the light source does not intersect the sensing surface.

2. The particle sensing device according to claim 1, wherein the detecting channel has an upstream stretch and an inlet, the upstream stretch of the detecting channel is located between the sensing space and the inlet of the detecting channel, and an inner diameter of the upstream stretch of the detecting channel is increasing from the sensing space towards the inlet of the detecting channel.

3. The particle sensing device according to claim 1, wherein an angle between the direction of the light emitted from the light source and a normal of the sensing surface ranges from 60 degrees to 120 degrees.

4. The particle sensing device according to claim 1, wherein the detecting channel has an inlet at an upstream end thereof, and the protrusion is located between the space opening and the inlet of the detecting channel.

5. The particle sensing device according to claim 4, wherein the central axis of the space opening is substantially perpendicular to a flow direction of the detecting channel.

6. The particle sensing device according to claim 4, wherein the protrusion has a curved surface.

7. The particle sensing device according to claim 4, wherein the protrusion has a sharp top end or a blunt top end having a curvature radius in a range from 0.25 mm to 0.75 mm.

8. The particle sensing device according to claim 4, wherein the protrusion has a side surface extended to and flush with the inner surface of the surrounding wall.

9. The particle sensing device according to claim 8, wherein a flow direction of the detecting channel is perpendicular to the side surface of the protrusion.

10. The particle sensing device according to claim 1, further comprising an inflow channel and a secondary channel, wherein the detecting channel has an inlet at an upstream end thereof, the inflow channel is connected to the inlet of the detecting channel, a flow direction of the inflow channel is not parallel to a flow direction of the detecting channel, and the secondary channel is connected to a junction of the inflow channel and the detecting channel.

11. The particle sensing device according to claim 10, wherein the secondary channel comprises an upstream stretch and a downstream stretch connected to the upstream stretch of the secondary channel, the upstream stretch of the secondary channel is connected to the junction of the inflow channel and the detecting channel, and a flow direction of the upstream stretch of the secondary channel is substantially parallel to the flow direction of the inflow channel.

12. The particle sensing device according to claim 11, wherein the upstream stretch of the secondary channel has a first central axis in parallel with the flow direction of the upstream stretch of the secondary channel, the inflow channel has a second central axis in parallel with the flow direction of the inflow channel, the first central axis is not coaxial with the second central axis, and the first central axis is closer to an intersection of a direction of the light emitted from the light source and the detecting channel than the second central axis to the intersection.

13. The particle sensing device according to claim 11, further comprising an outflow channel, wherein the detecting channel further has an outlet at a downstream end thereof, the outflow channel is connected to the outlet of the detecting channel, one end of the downstream stretch of the secondary channel located away from the upstream stretch of the secondary channel is connected to the outflow channel, and one end of the upstream stretch of the secondary channel located away from the downstream stretch of the secondary channel is connected to the junction of the inflow channel and the detecting channel.

14. The particle sensing device according to claim 10, further comprising a protrusive structure located at the junction of the inflow channel and the detecting channel and located on a side wall of the inflow channel located closer to an intersection of a direction of the light emitted from the light source and the detecting channel, wherein a distance between the protrusive structure and a side wall of the inflow channel located farther away from the intersection is smaller than an inner diameter of the inflow channel.

15. The particle sensing device according to claim 10, wherein the secondary channel has a first inner diameter, the inflow channel has a second inner diameter, and the first inner diameter is larger than the second inner diameter.

16. The particle sensing device according to claim 15, wherein a ratio of the first inner diameter to the second inner diameter ranges from 1.2 to 2.

17. The particle sensing device according to claim 10, wherein the flow direction of the inflow channel is substantially perpendicular to the flow direction of the detecting channel.

18. The particle sensing device according to claim 1, further comprising a fan disposed at a downstream end of the detecting channel.

* * * * *